US007887245B1

(12) United States Patent
Hawkins (10) Patent No.: US 7,887,245 B1
(45) Date of Patent: Feb. 15, 2011

(54) TYPEWRITER SYSTEM WITH PRINTER AND SCANNER

(76) Inventor: Wynter S. Hawkins, 4907 Shafer St., Norfolk, VA (US) 23513

( * ) Notice: Subject to any disclaimer, the term of this patent is extended or adjusted under 35 U.S.C. 154(b) by 0 days.

(21) Appl. No.: 12/229,141

(22) Filed: Aug. 20, 2008

Related U.S. Application Data

(63) Continuation-in-part of application No. 11/371,067, filed on Mar. 9, 2006, now abandoned.

(60) Provisional application No. 60/660,234, filed on Mar. 11, 2005.

(51) Int. Cl.
*B41J 29/38* (2006.01)
*B41J 29/00* (2006.01)

(52) U.S. Cl. .................. 400/76; 400/693; 347/108; 361/679.08; 361/679.09

(58) Field of Classification Search .............. 400/693; 347/108
See application file for complete search history.

(56) References Cited

U.S. PATENT DOCUMENTS

| 4,810,117 | A | * | 3/1989 | Hattori ..................... 400/212 |
| 5,544,045 | A | * | 8/1996 | Garland et al. ............... 704/3 |
| 6,026,187 | A | * | 2/2000 | Siegel ...................... 382/213 |
| 6,088,121 | A | * | 7/2000 | Baumann ................... 358/1.18 |
| 6,752,554 | B1 | * | 6/2004 | Brittingham ................ 400/693 |
| 7,259,895 | B2 | * | 8/2007 | Tecu et al. .................. 358/474 |
| 2008/0117239 | A1 | * | 5/2008 | Huang et al. .................. 347/3 |

FOREIGN PATENT DOCUMENTS

| JP | 04369023 A | * | 12/1992 |
| JP | 06305214 A | * | 11/1994 |
| JP | 10261097 A | * | 9/1998 |
| JP | 2001274930 A | * | 10/2001 |
| JP | 2005018364 A | * | 1/2005 |

* cited by examiner

*Primary Examiner*—Daniel J Colilla
(74) *Attorney, Agent, or Firm*—Bowman Green Hampton & Kelly, PLLC (57) ABSTRACT

A typewriting system that includes a scanning component for scanning a document that is inserted into the typewriting system; a computing component for translating information relating to the scanned document to a displayable format; a display for displaying at least the translated information relating to the scanned document; an input device that allows a user to enter and or edit information relating to the scanned document; and a printing component for printing at least be interred or edited information onto the document that is inserted into the typewriting system. In various exemplary embodiments, the scanning component, the printing component, a computing component, the display, and the input device are contained within a single housing.

8 Claims, 8 Drawing Sheets

TYPEWRITER SYSTEM WITH PRINTER AND SCANNER

CROSS-REFERENCE TO RELATED APPLICATIONS

This is a Continuation-In-Part of U.S. patent application Ser. No. 11/371,067, filed Mar. 9, 2006, now abandoned which claims the benefit of U.S. Provisional Patent Application Ser. No. 60/660,234, filed Mar. 11, 2005, the disclosures of which are incorporated herein by reference.

BACKGROUND OF THE INVENTION

1. Field of the Invention

The present invention is directed generally to a typewriter system. More specifically, the present invention is directed to a typewriter system that provides a user with the ability to scan, view, print, edit, and store documents.

2. Description of Related Art

Office documents such as forms and letters are generally mechanically or electronically produced using typewriters, word processors, computers, and printers. However in order to complete preprinted documents digitally in the home and office environments the use of additional equipment outside of the personal computer is needed such as a typewriter or word processor to type information into pre-printed documents or forms. However with the invention of the scanner, printer and editing software many preprinted documents can be scanned and then edited and then printed to create various document. The problem with this process is that it is time consuming because each process is done separately so there remains a need for a convenient method to scan, edit, and print on a preprinted document or forms simultaneously. In addition, many typewriters used a separate ribbon segment that removes ink impressions from paper, permitting the user to erase text, other typewriters permit rudimentary editing of text before printing, through the use of a small liquid crystal display window. This is cumbersome and time consuming when compared to computer or word processor editing. Furthermore, mechanical typewriters are limited in the choices of characters that may be produced.

Scanners have been used to convert pictures from existing document or text and/or images into a digital format. Typewriters provide immediate production of a hard copy and allow for exact placement of text in forms and documents and can be edited by a corrective device. Computers allow for storing and retrieval of document that are saved to a hard drive before or after printing. However there is not a device that specifically addresses the need to combine the functions of a scanner, a printer and computer in order to provide typing that renders simultaneous print on a scanned paper document as key are stuck on the keyboard with immediate editing after rendering of printed material as shown on a display within the relative confines of a personal computer.

SUMMARY OF THE INVENTION

The prior systems and methods require that a user use multiple pieces of hardware to achieve a desired result and not provide for a high level of real time editing of documents, such as preprinted forms.

Accordingly, the present invention is directed generally to a typewriter system. More specifically, the present invention is directed to a typewriter system that provides a user with the ability to scan, view, print, edit, and store documents. Using the systems and methods of the present invention, as keys are struck on the keyboard, documents, such as preprinted forms, can be edited and an immediate hard copy of the document can be produced in an easy, simple, time efficient method, within a device that is similar to a personal computer.

In various exemplary, non-limiting embodiments of the present invention, the typewriting system provides functions common to that of a scanner, a printer, a keyboard, a display, and a personal computer. Using this device, the user is able to simultaneously print text and/or images on a scanned paper document, shown text and/or images on a display, and send the text and/or images to a hard drive.

The user may also choose to compose and entire document before printing, edit a document immediately after printed text is rendered, and store and retrieve a document after printing, as desired. The present invention is compact enough to replace a standard computer keyboard and does not require additional devices to provide a user with these functions.

In various exemplary, non-limiting embodiments of the typewriting system, the system is used apart from a keyboard but it is small enough to stay within the confines of the personal computer.

In various exemplary, non-limiting embodiments, the typewriting system is housed within a laptop computer and provides simultaneous printing of typed text on a scanned paper document, which can be edited immediately after rendering of printed material visible to user and sent to the hard drive for storing and retrieval to avoid remote and secondary machinery outside the laptop computer.

Accordingly, this invention provides a typewriter system that allows a user to efficiently scan, view, print, edit, and store documents.

This invention separately provides an improved method of combining the functions of a scanner, a printer, a keyboard, a display, and a computer as a means for rendering printed material instantly within the confines of a single system.

This invention separately provides for simultaneous printing on a scanned paper document and creation of digital representation of printed material in digital format that is visible to user on a display as keys are struck on the keyboard.

This invention separately provides for optional sending of data to a hard drive or other storage device for storing and retrieval.

This invention separately provides users with a typewriting system as a stand alone machine that works in conjunction with an existing computer system to provide simultaneous printing that combines a scanning component, a printing component that renders hard copies that can be edited immediately after print, sent to a hard drive for storing and retrieval.

This invention separately provides a convenient method of rendering a hard copy of printed material as keys are struck from the relative position of the keyboard on a scanned document while simultaneously shown in digital representation on a display and can be saved to a computer hard drive for storing and retrieval.

This invention separately provides a typewriting system of compact design that saves space.

This invention separately provides a corrective means of editing printed text on a scanned paper document immediately after rendering on a hard copy document.

This invention separately provides a modern typewriting system that is convenient, effective, and simple to use within the relative confines of the personal computer system to render instant hard copy documents.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF EXEMPLARY EMBODIMENTS

For simplicity and clarification, the design factors and operating principles of the typewriting system according to this invention are explained with reference to various exemplary embodiments of a typewriting system according to this invention. The basic explanation of the design factors and operating principles of the typewriting system is applicable for the understanding, design, and operation of the typewriting system of this invention.

It should also be appreciated that the terms "typewriter" and "typewriting" are used for basic explanation and understanding of the operation of the systems, methods, and apparatuses of this invention. Therefore, the terms "typewriter" and "typewriting" are not to be construed as limiting the systems, methods, apparatuses, or applications of this invention.

As illustrated in the drawing Figs, the typewriting system 100 comprises at least some of a scanning component 110, a printing component 120, a computing component 130, a display 140, and an input device such as a keyboard 150.

The scanning component 110 comprises components typically used in a flatbed or other scanner. In operation, the scanning component 110 utilizes a light source to illuminate the image on an inserted document 190. A motor moves a scan head across the illuminated document 190 such that the scan head captures light that is reflected from individual areas of the document 190. The captured light is focused, via one or more lenses and/or mirrors, onto light sensitive diodes that translate the amount of light into an electrical current. An analog to digital (A-to-D) converter stores each analog reading of voltage as a digital pixel representing either a black, white, or gray area. If the scanning component 110 comprises a color scanner, a scanned head may make multiple passes (typically three) of the document and the reflected light from each pass may be directed through a red, green, or blue filter before it strikes the original image.

Once the digital pixel information is acquired, it is sent to the computing component 134 is translated into an appropriate graphic to be displayed on the display 140.

It should be appreciated that the components of the scanning component 110 may comprise components of any known or later developed scanning means.

In various exemplary embodiments, the printing component 120 comprises an inkjet or laser printer. The components and operation of such printers are generally known to those of ordinary skill in the art. A printing component 120 that is integrated into the typewriting system 100 is customary in prior art of printers and various mechanical and electronic typewriters such as a print cartridge, ink-jet, thermal, dot-matrix impact printers or any other printers occupying a small space that is used to place the text on the document 190.

The computing component 130 comprises at least some of a hard drive 132, a processing unit 134, an integrated video chip 136, and a memory 138.

The display 140 comprises a monitor or other display device is capable will provide instant feedback to the user by displaying text and/or graphic images. It should be appreciated that the display 140 may comprise a liquid crystal display (LCD), a cathode ray tube (CRT), or any other known or later developed display device.

The input device comprises an element or device for entering information or otherwise manipulating the text and/or graphics displayed on the display 140. In various exemplary embodiments, the input device may comprise one or more of a keyboard, such as, for example, keyboard 150 or a mouse.

During operation, the components of the typewriting system 100 allow a user to insert a document 190 into the typewriting system 100. Once a document 190 is placed in the input slot 115 it is adjusted, aligned, and placed in position to be scanned. This system allows an automatic margin sensors 102 used in conjunction with paper feed mechanism 103 to automatically detect the size of the document 190 when document 190 is inserted into the input slot 115.

A paper path 112 allows for placement of paper in proximity of the scanning component 110 and printing component 120. As document 190 moves through said typewriting system 100 by the paper feed mechanism 103, the entire document 190 is scanned by the scanning component 110. Once the document 190 is scanned, scanner software 104 sends images and/or text to a microprocessor 105.

The microprocessor 105 formats the collected images and/or text into pixels that converts images and/or text to an integrated video chip 136 for display on display 140 while simultaneously sending data through the processing unit 134 to the hard drive 132 and to memory 138 for storing and retrieval.

Once document 190 is scanned by the scanning component 110 and then placed in a convenient position, the scanned image is simultaneously displayed on the display 140 and saved to a storage device, such as, for example, a hard drive 132.

As the document 190 is displayed, the displayed text or images can be edited using the computing component 130 and the keyboard 150.

The printing component 120, visible through window 109, is then capable of either printing edits onto the original document 190 or printing a new, edited or an edited, version of the document 190.

Figure 1:
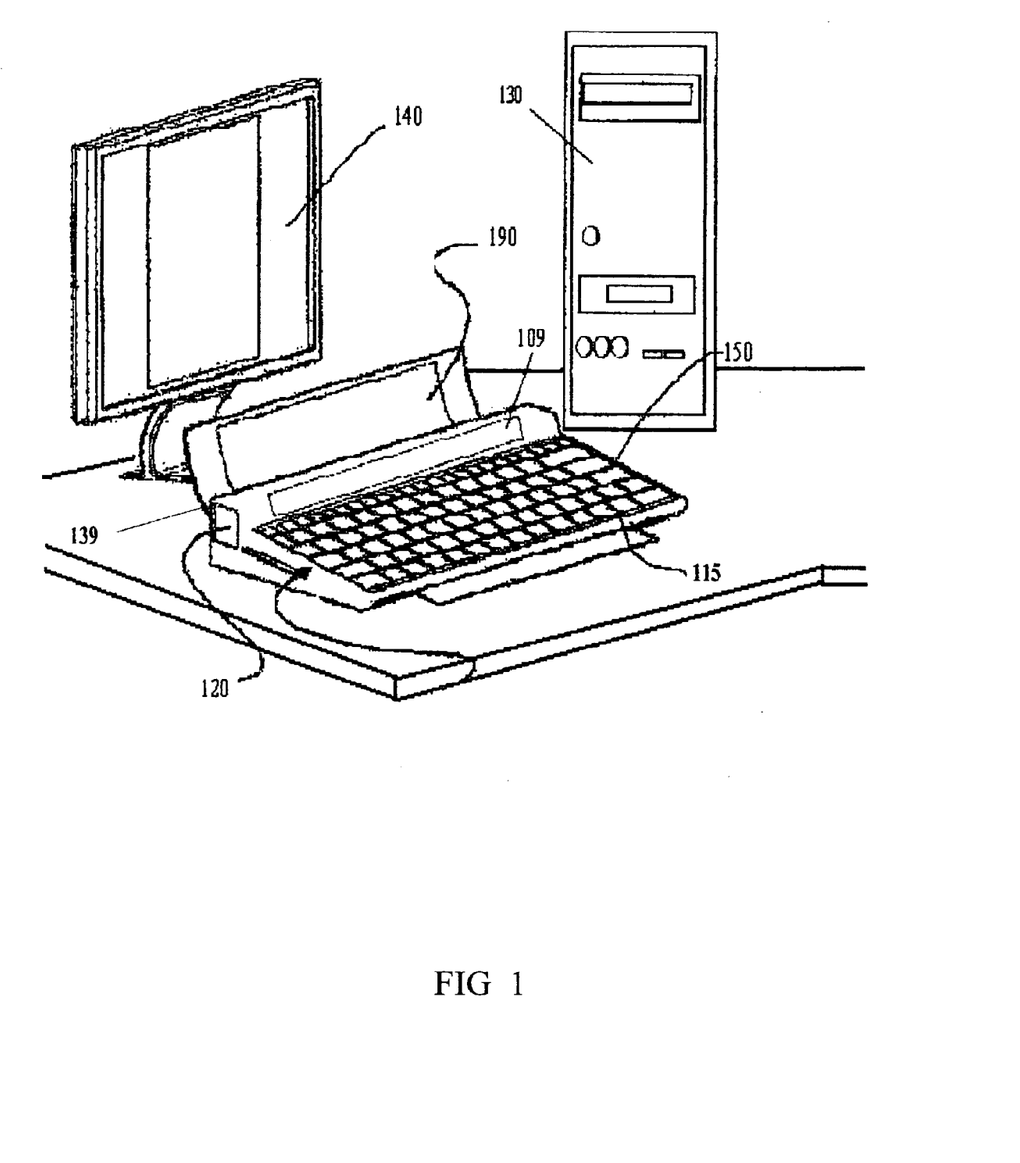
FIG. 1 shows a perspective view of a first exemplary embodiment of a typewriting system according to this invention, wherein the scanning component is generally located under the keyboard, the printing component, visible through a window, is generally located at a top of the keyboard, and the display is not formed integral to the keyboard.
Figure 2:
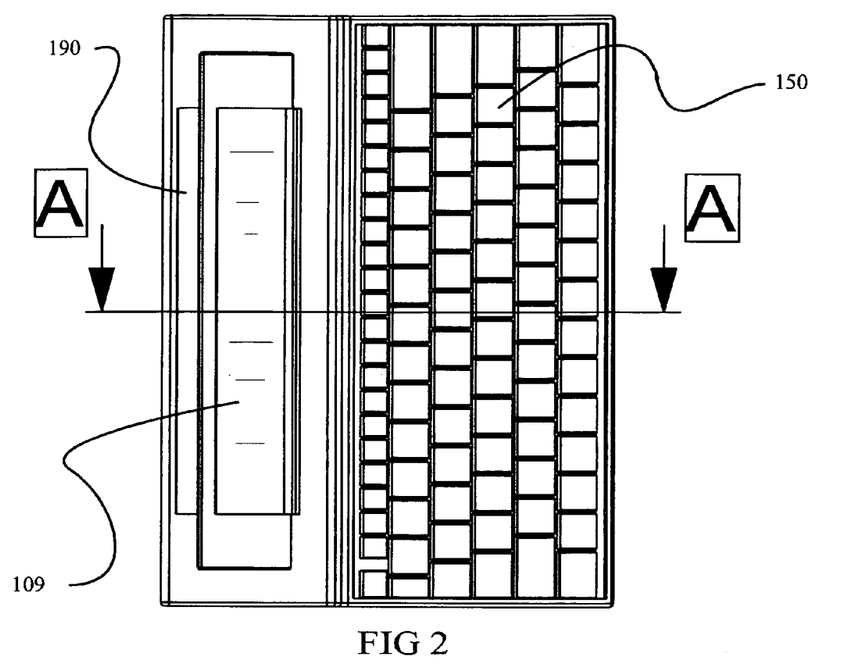
FIG. 2 shows a top section view of a first exemplary embodiment of a typewriting system according to this invention, wherein the scanning component is generally located under the keyboard, the printing component, visible through a window, is generally located at a top of the keyboard, and the display is not formed integral to the keyboard.
Figure 3:
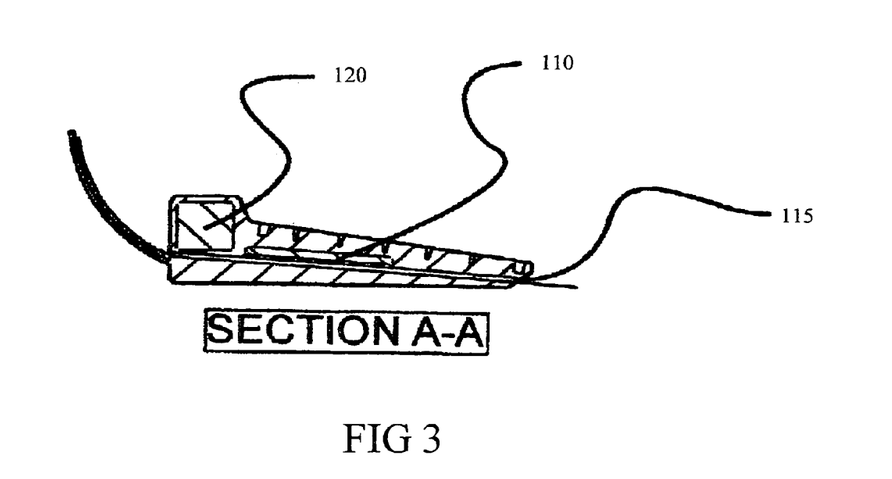
FIG. 3 shows a cross-sectional view taken a long line A-A of FIG. 2, showing a first exemplary embodiment of a typewriting system according to this invention, wherein the scanning component is generally located under the keyboard, the printing component, visible through a window, is generally located at a top of the keyboard, and the display is not formed integral to the keyboard.

The typewriting system 100 as shown in FIGS. 1, 2, 3, is similar to the layout of a common computer keyboard 150 connected to a microprocessor 105 and controller circuitry. Located underneath the keyboard 150 of the typewriting system 100 is a key matrix 107 that is monitored by a microprocessor 105. As keys are struck, the microprocessor 105 analyzes the key matrix 107 and interprets what text is to be sent to the print device 120, visible through window 109, the display 140, the computing component 130, and the hard drive 132.

A keyboard 150 connector cable 118, sends data to a computer port, facilitating immediate response time between when the keys are struck and when the text appear on the display 140 and placed on document 190 and sent to computer hard drive 132.

Figure 4A:
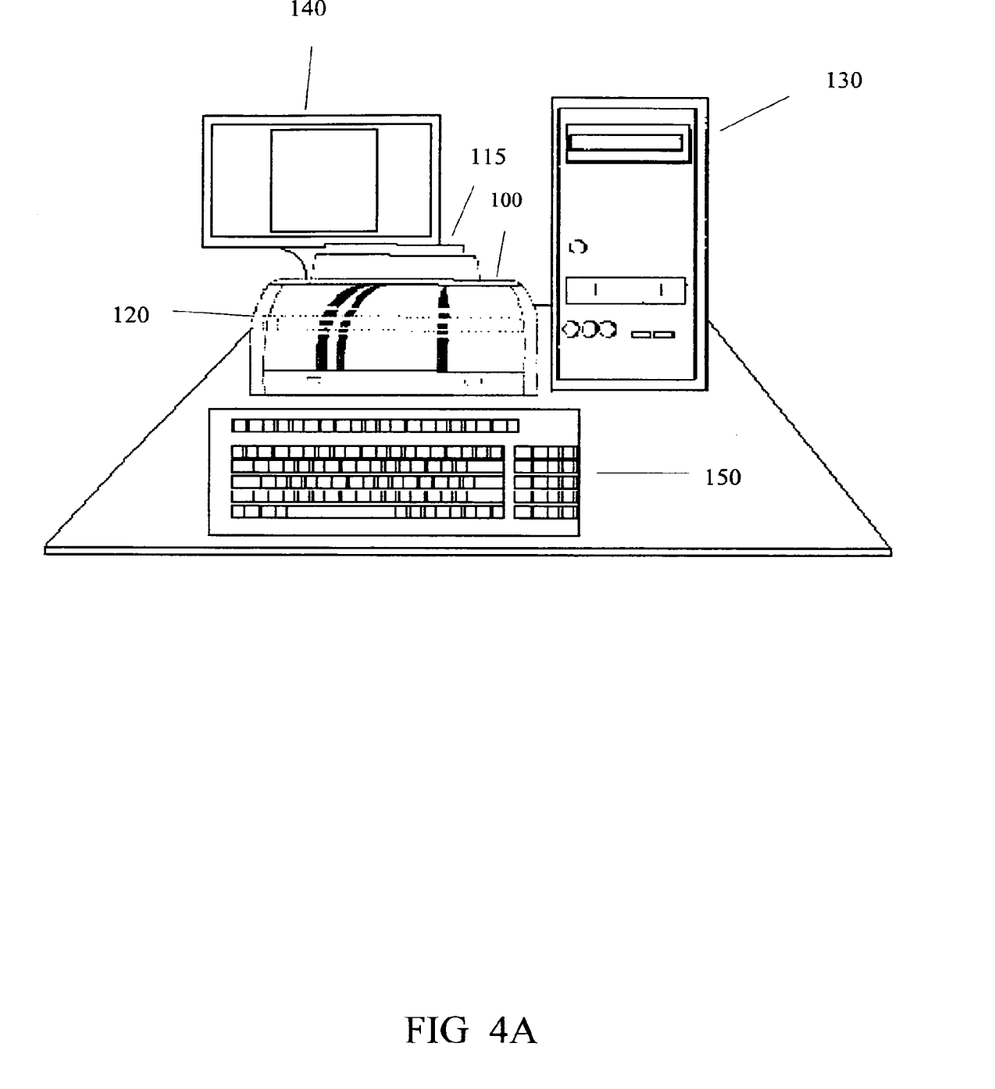
FIG. 4A shows a perspective view of a first exemplary embodiment of a typewriting system according to this invention, wherein the keyboard is removed from the scanning and printing component.
Figure 4B:
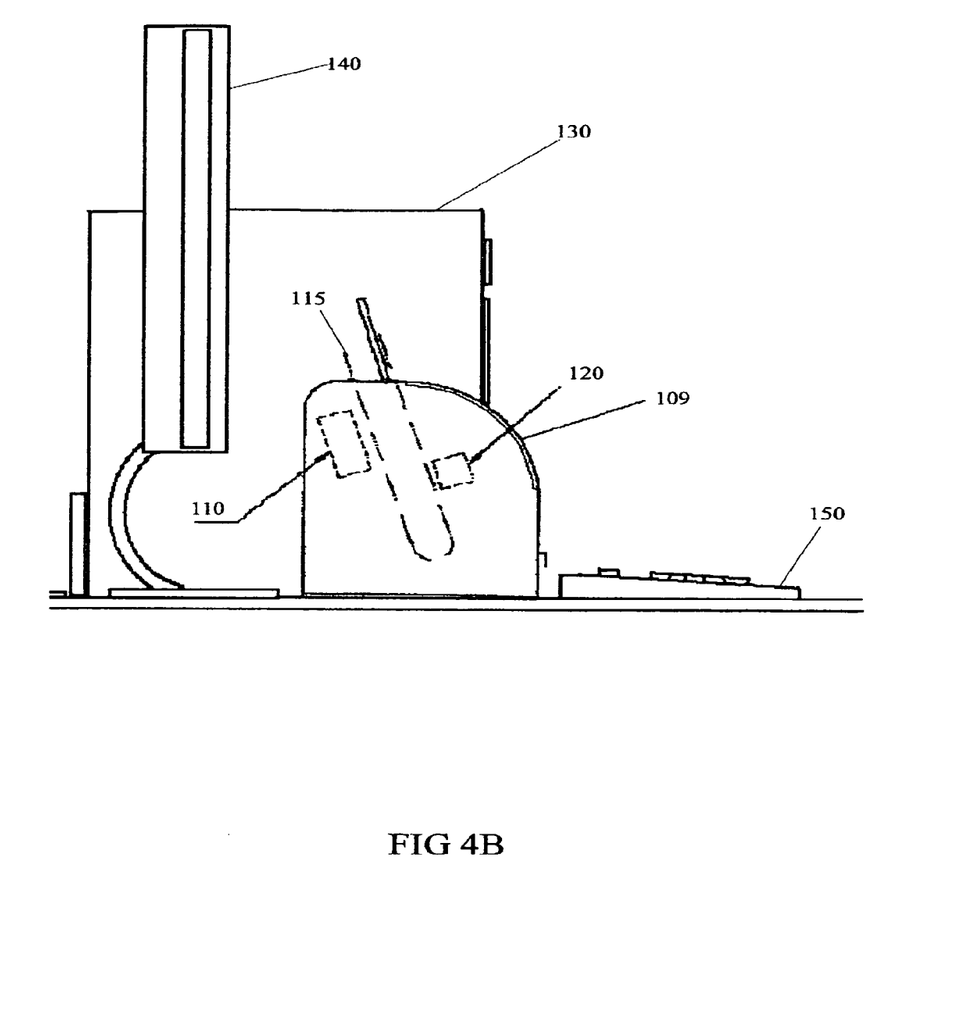
FIG. 4B shows section view of a first exemplary embodiment of a typewriting system according to this invention, wherein the keyboard is removed from the scanning and printing component.

As illustrated in FIGS. 4A and 4B, in various exemplary embodiments, the typewriter system 100 comprises a scanning component 110, a printing component 120, visible through window 109, a computing component 130, a display 140, and a keyboard 150. As illustrated, the display 140 and the keyboard 150 are detached from the scanning component 110.

Figure 5A:
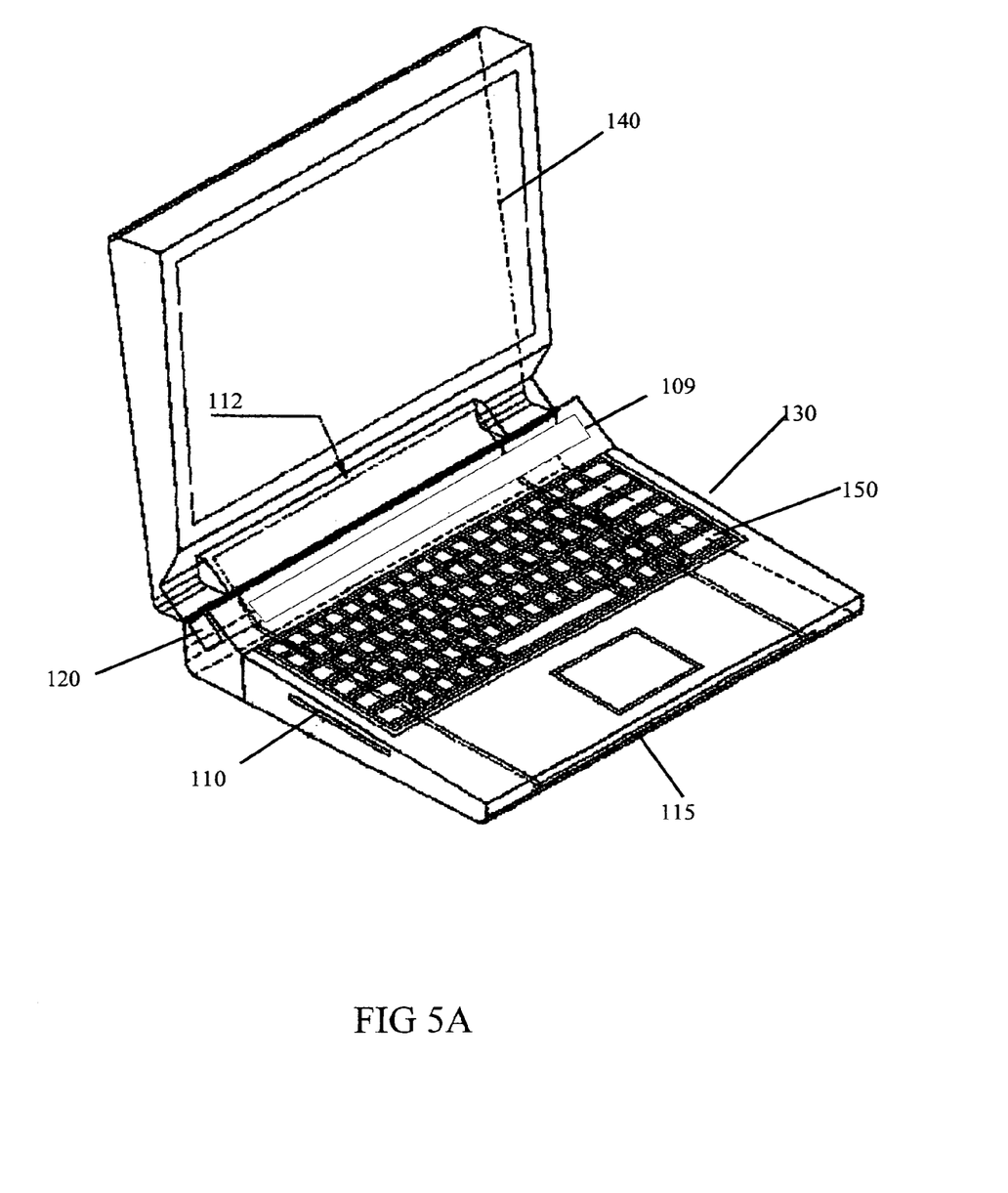
FIG. 5A shows a perspective view of a second exemplary embodiment of a typewriting system according to this invention, wherein the scanning component is generally located under the keyboard, the printing component, visible through a window, is generally located at a top of the keyboard, and the display is formed integral to the keyboard.
Figure 5B:
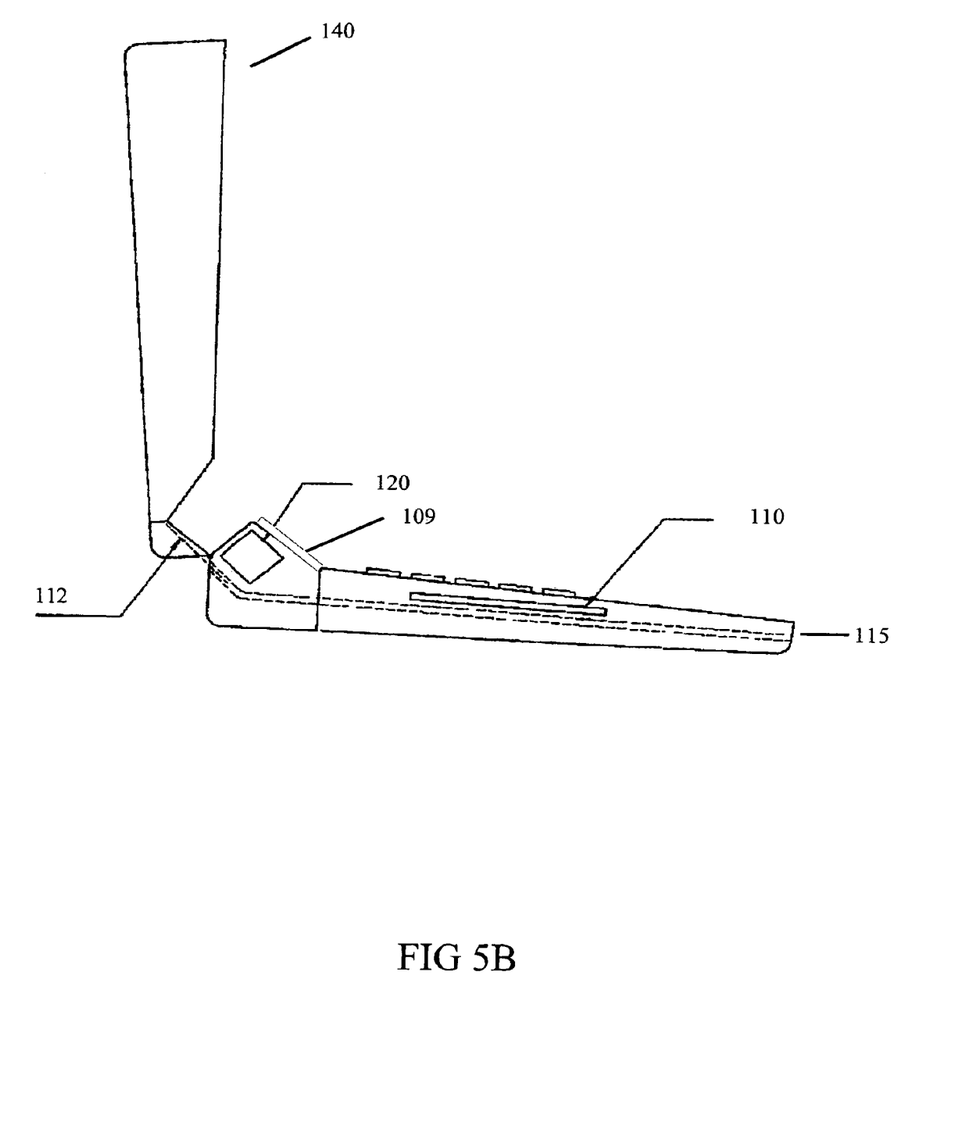
FIG. 5B shows a side view of the second exemplary embodiment of a typewriting system according to this invention, wherein the scanning component is generally located under the keyboard, the printing component, visible through a window, is generally located at a top of the keyboard, and the display is formed integral to the keyboard.

Additionally a further rendering of the proposed invention is a typewriting system 100 that integrates a scanning component 110, a printing component 120, visible through window 109, a computing component 130, a display 140, and a keyboard 150 into a Laptop as shown in FIGS. 5A and 5B.

Figure 6:
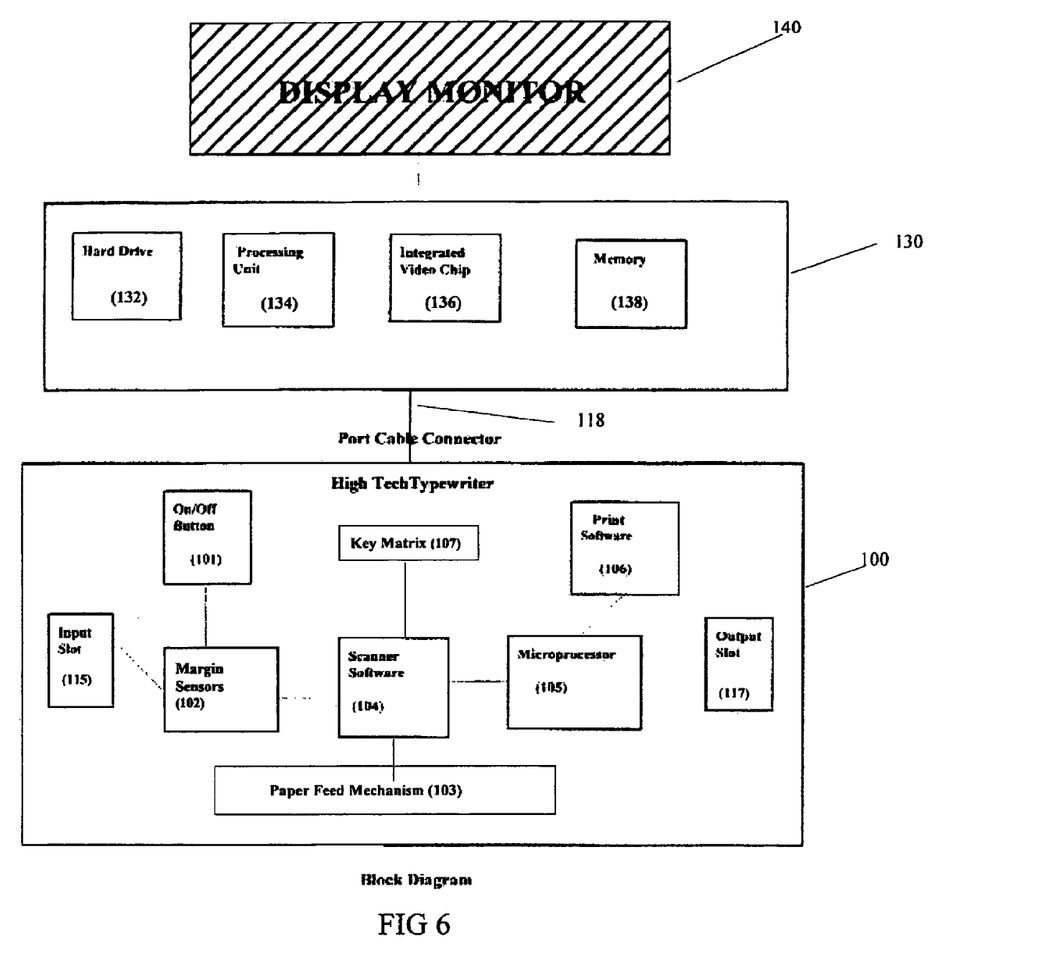
FIG. 6 shows a block diagram outlining the components of the typewriting system of the present invention.
Figure 7:
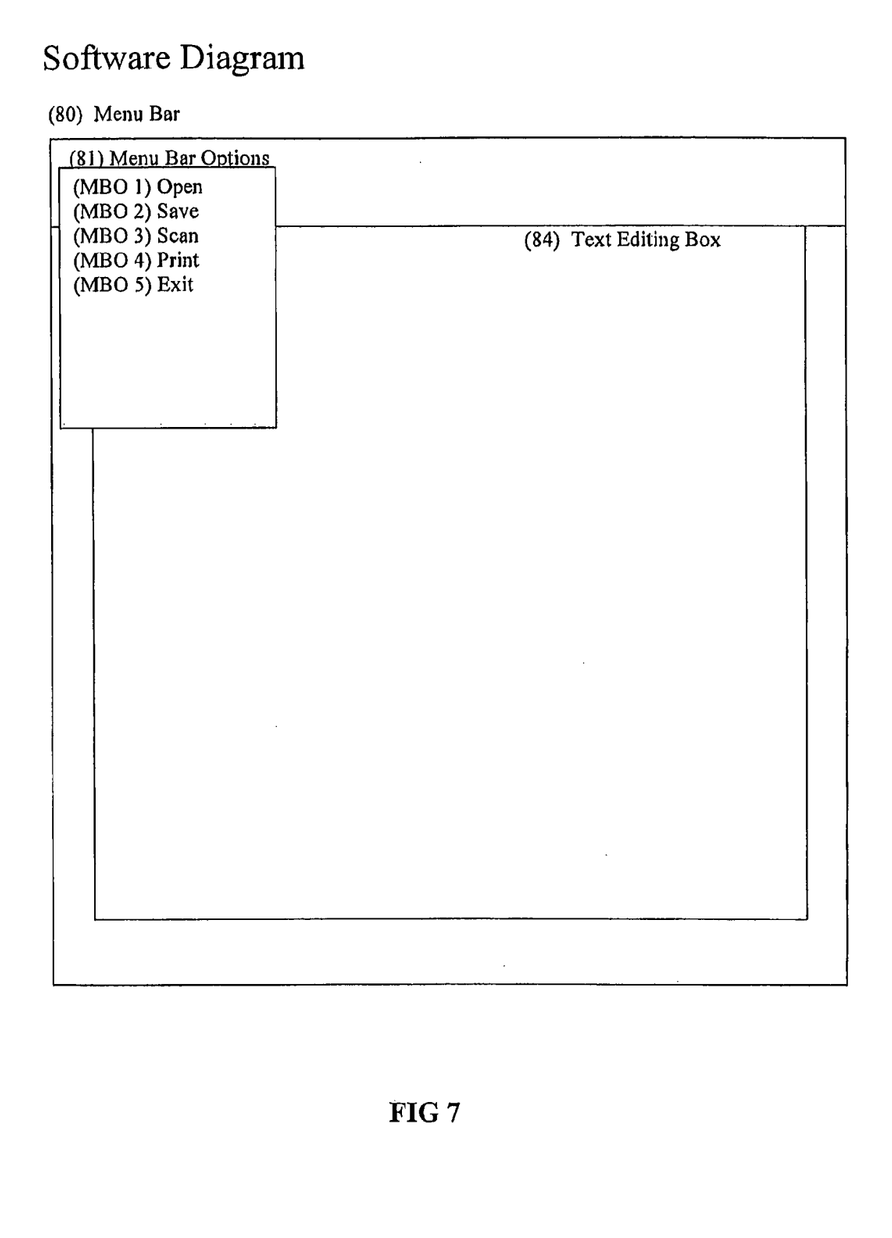
FIG. 7 shows an exemplary software diagram illustrating an exemplary graphic user interface, according to this invention.

Although being three different rendering of the same typewriting system as shown in FIGS. 1-5B these machines individually performs functions according to FIG. 6 facilitated by software as shown FIG. 7 to provide simultaneous printing on scanned paper document 190 and shown on display 140 and can be edited immediately after printed material is rendered on scanned paper document 190 and sent to hard drive 132 for storage and retrieval.

The typewriting system 100 includes on/off button 101, input slot 115, components to move document 190 that are common with prior powered paper-feed rollers and paper feed mechanism 103 to eject document 190 onto output slot 117 once the printing function is completed.

Software Diagram FIG. 7 shows one exemplary embodiment of a Graphic User Interface that can be utilized with the typewriting system 100. Menu Bar Object (MBO 1) when selected executes the Open Menu_click event handler. A message is sent to microprocessor 105 and the Open Dialog Box is displayed for the user to open text document. Menu Bar Object (MBO 2) when selected executes the Save Menu_click event handler. A message is sent to the processing unit 134 and the Save Dialog Box is displayed for the user to save the document. Computer Hard Drive allocates Space for document in specified fold. Document is then written to the Hard Drive.

Menu Bar Object (MBO 4) when selected executes the Scan_click event handler. A message is sent to processing unit 134 and the Scan Document Form is displayed for the user to set Scan options. Parameters are passed to scanner software 104 which sends the request to microprocessor 105. Scanner software 104 handles the scanning process. Menu Bar Object (MBO 4) when selected executes the Print All_click event handler. A message is sent to processing unit 134 and the Print Dialog Box is displayed for the user to set print options. Parameters are passed to processing unit 134 which sends the request to microprocessor 105 and print software 106 handles the print process. Menu Bar Object (MBO 5) when selected executes the Exit Menu_click event handler. A message is sent to the processing unit 134 and application shuts down.

During operation of the typewriting system 100, the user manipulates the on/off button 101 to the on position and places document 190 in the input paper slot 115 at the beginning of the paper path 112. A powered paper feed mechanism 103 with rollers, gears and margin sensors 102 moves the paper along the paper path 112 past the scanning component 110.

The scanner software 104 digitizes the document to allow text and/or images on the document 190 to be formatted through a microprocessor 105, recorded on hard drive 132, and displayed by means of the integrated video chip 136 on the computer display 140.

Once document 190 is scanned through the typewriting system 100 and placed in a convenient position to print device 120, visible through window 109, once typing functions ensue and printing functions engage the paper document 190 can be edited immediately thereafter facilitated by print software 106 if desired as is performed with standard word processors or typewriters.

The primary benefit of the typewriting system 100 is realized as the user types as one would with a standard typewriter in the relative position to the keyboard 150, thus printing visible images and/or text directly onto the document 190. In this instance, text is printed at the same moment when keys on the keyboard 150 are struck, a digital representation 104 is placed on the display 140 and sent to the computer hard drive 132 allowing the user to produce an immediate hard copy document 190 while instantly producing a digital copy in the memory 138 for data storage and retrieval. An output slot 117 facilitates the ejection of the completed paper document 190 onto an output tray 139.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A typewriting system, comprising:
   a scanning component for scanning a document that is inserted into the typewriting system;

a computing component for translating information relating to the scanned document to a displayable format, wherein the computing component comprises a processing unit;

a display for displaying at least the translated information relating to the scanned document;

an input device, wherein the input device comprises a keyboard having keys, which allows a user to enter and or edit information relating to the scanned document; and a printing component controlled by the processing unit to simultaneously print, when a key on the keyboard is struck, the entered or edited information relating to the scanned document onto the scanned document that is inserted into the typewriting system, if the user enters or edits information relating to the scanned document;

wherein each of the scanning component, the printing component, a computing component, the display, and the input device are contained within a single housing;

wherein the printing component is an inkjet or laser printer.

2. The typewriting system of claim 1, wherein the input device comprises a keyboard.

3. The typewriting system of claim 1, wherein the computing component comprises at least some of an integrated video chip and a memory.

4. The typewriting system of claim 1, wherein the housing further includes an input slot for receiving a document and an output slot where the document can be ejected from the system.

5. The typewriting system of claim 1, further including a paper path located proximate the keyboard to allow documents to be moved through said typewriting system.

6. The typewriting system of claim 1, wherein the typewriting system is contained within a laptop computer.

7. A method for using a typewriting system, comprising:

allowing a document to be inserted into the typewriting system, wherein the elements of the typewriting system are contained within a single housing;

scanning, via a scanning component, the inserted document;

translating, via a computing component, information relating to the scanned document to a displayable format;

displaying, via a display, at least the translated information relating to the scanned document;

receiving entered or edited information relating to the scanned document, via an input device, wherein the input device comprises a keyboard having keys;

simultaneously printing, as the entered or edited information is received, the entered or edited information onto the scanned document in the typewriting system, via a printing component;

wherein the printing component is an inkjet or laser printer.

8. The method of claim 7, wherein the typewriting system is contained within a laptop computer.

* * * * *